United States Patent
Jiang et al.

(10) Patent No.: US 10,545,368 B2
(45) Date of Patent: Jan. 28, 2020

(54) LIQUID CRYSTAL DISPLAY PANEL AND MANUFACTURING METHOD THEREOF, DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Ni Jiang, Beijing (CN); Xi Xiang, Beijing (CN); Shiqi Chen, Beijing (CN); Yuanming Feng, Beijing (CN); Xiongcan Zuo, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 49 days.

(21) Appl. No.: 15/847,536

(22) Filed: Dec. 19, 2017

(65) Prior Publication Data
US 2018/0284537 A1    Oct. 4, 2018

(30) Foreign Application Priority Data
Mar. 31, 2017  (CN) .......................... 2017 1 0211408

(51) Int. Cl.
*G02F 1/1335*  (2006.01)
*G02B 5/30*  (2006.01)
*G02F 1/1345*  (2006.01)

(52) U.S. Cl.
CPC ..... *G02F 1/133528* (2013.01); *G02B 5/3058* (2013.01); *G02F 1/13458* (2013.01);
(Continued)

(58) Field of Classification Search
CPC .... G02B 5/3033; G02B 5/3025; G02B 27/26; G02B 5/3058; Y10T 428/1041;
(Continued)

(56) References Cited

U.S. PATENT DOCUMENTS

2007/0285598 A1* 12/2007 Hwang ............. G02F 1/133528
349/96
2014/0293187 A1* 10/2014 Nam ................... G02F 1/13362
349/62
(Continued)

FOREIGN PATENT DOCUMENTS

CN        104459863 A      3/2015
CN        104460016 A      3/2015
(Continued)

OTHER PUBLICATIONS

Second Office Action for CN Application No. 201710211408.7, dated Nov. 15, 2018.
(Continued)

*Primary Examiner* — Jia X Pan
(74) *Attorney, Agent, or Firm* — Foley & Lardner LLP; James F. Ewing; Paul M. H. Pua

(57) ABSTRACT

The present disclosure provides a liquid crystal display panel and a manufacturing method thereof, a display device. The liquid crystal display panel comprises a display module (1), which comprises a plurality of pixel units, each of the pixel unit including a display area (101) and a non-display area (102), wherein a grounded anti-static film is formed on a part of a light-emitting surface of the display module (1) corresponding to the non-display area (102), and a metal grating film (201) having a polarizing function is formed on a part of the light-emitting surface of the display module (1) corresponding to the display area (101). The display device comprises the liquid crystal display panel as mentioned in the above technical solution.

14 Claims, 4 Drawing Sheets

(52) U.S. Cl.
CPC ............ *G02F 2001/133548* (2013.01); *G02F 2202/22* (2013.01); *G02F 2202/28* (2013.01)

(58) Field of Classification Search
CPC ........... G02F 1/133528; G02F 1/13362; G02F 2001/133548; G02F 2202/22; G02F 1/136204
See application file for complete search history.

(56) References Cited

U.S. PATENT DOCUMENTS

2016/0357063 A1* 12/2016 Liu ..................... G02B 5/3058
2017/0336686 A1* 11/2017 Cui ..................... G02F 1/13338

FOREIGN PATENT DOCUMENTS

| | | |
|---|---|---|
| CN | 105137649 A | 12/2015 |
| CN | 106405927 A | 2/2017 |
| CN | 106842691 A | 6/2017 |
| JP | 2008-256975 A | 10/2008 |

OTHER PUBLICATIONS

CN First Office Action for CN Application No. 201710211408.7, dated Jun. 5, 2018.
International Search Report and Written Opinion for PCT/CN2017/111612, dated Feb. 14, 2018.

* cited by examiner

LIQUID CRYSTAL DISPLAY PANEL AND MANUFACTURING METHOD THEREOF, DISPLAY DEVICE

CROSS REFERENCE TO RELATED APPLICATIONS

This application claims priority to Chinese Patent Application No. 201710211408.7 filed on Mar. 31, 2017, the disclosure of which is incorporated herein in its entirety by reference.

TECHNICAL FIELD

The present disclosure relates to a liquid crystal display panel and a manufacturing method thereof, a display device.

BACKGROUND

An Advanced Super Dimension Switch (ADS) type of display screens are wide-view displays, which can meet the requirement on the view width of large-size displays, and are advantageous for high contrast, high brightness and strong color fidelity, such that they are widely popular.

SUMMARY

The present disclosure provides the following technical solution:

The present disclosure provides a liquid crystal display panel, comprising a display module, the display module including a plurality of pixel units, each of the pixel units including a display area and a non-display area, wherein a grounded anti-static film is formed on a part of a light-emitting surface of the display module corresponding to the non-display area, and a metal grating film having a polarizing function is formed on a part of the light-emitting surface of the display module corresponding to the display area.

The present disclosure further provides a method for manufacturing a liquid crystal display panel, comprising:

providing a display module, the display module comprising a plurality of pixel units, each of the pixel units including a display area and a non-display area;

forming a grounded anti-static film on a part of the light-emitting surface of the display module corresponding to the non-display area; and forming a metal grating film on a part of the light-emitting surface of the display module corresponding to the display area.

The present disclosure further provides a display device, comprising the liquid crystal display panel provided by the above technical solution.

BRIEF DESCRIPTION OF THE DRAWINGS

The drawings as demonstrated here are used to provide further understandings on the present disclosure and form a part of the present disclosure. Illustrative examples of the present disclosure and interpretations thereon are used to interpret the present disclosure but shall not unduly define the present disclosure. Among the drawings.

DETAILED DESCRIPTION

Figure 1:
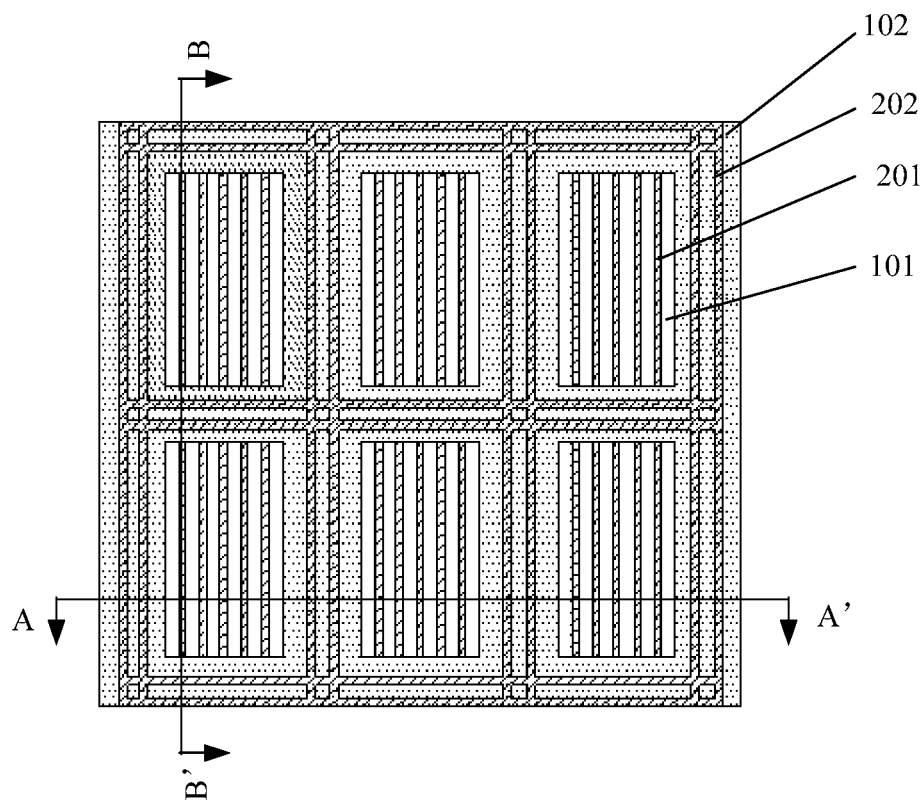
FIG. 1 is a structural schematic diagram showing an application of a first structure of a liquid crystal display panel provided by exemplary embodiments of the present disclosure to a display device.

In order to further illustrate the examples of the present invention, the examples are described in detail below with reference to the drawings. With reference to the drawings in the examples of the present invention, the technical solutions in the examples of the present invention are described in a clear and complete manner. Obviously, the described examples are just a portion instead of all of the examples of the present invention. Other examples obtainable to those skilled in the art based on the examples in the present invention without any creative effort all belong to the scope of protection by the present invention.

During manufacturing and practical usage of an existing ADS liquid crystal panel, certain static would be generated on the ADS display panel. When the static is accumulated to a certain extent, it would interfere the internal electric field of the ADS display panel. In order to solve this problem, a tin indium oxide thin film is formed on the light-emitting surface of the ADS display panel, and the tin indium oxide thin film is grounded in order to lead out the static generated during the manufacturing and practical usage, and thus the interference of the static on the internal electric field of the ADS display panel can be shielded.

However, although the arrangement of the grounded tin indium oxide thin film on the light-emitting surface of the ADS display panel can lead out a part of static generated during the manufacturing and practical usage, in order to meet the requirement on normal display, it is necessary to attach a polarizing patch above the tin indium oxide thin film, which increases the thickness of the ADS liquid crystal display panel and is unfavorable for the thinning of the ADS display panel.

It is an object of the present disclosure to provide a liquid crystal display panel and a manufacturing method thereof, a display device, in order to reduce the thickness of the display panel while shielding the influence of static on the internal electric field of the display panel.

Compared with the prior art, the liquid crystal display panel provided by the present disclosure has the following advantageous effects:

In the liquid crystal display panel provided by the present disclosure, a grounded anti-static film is formed on a part of a light-emitting surface of the display module corresponding to the non-display area, such that the static generated during the usage of the liquid crystal display panel can be lead out through the anti-static film, while a metal grating film having a polarizing function is formed on a part of the light-emitting surface of the display module corresponding to the display area, such that during the manufacturing of the display device, it is unnecessary to arrange a layer of polarizing film having a polarizing function on the light-emitting surface of the display module, but instead, it is only necessary to arrange a layer of polarizing film having a polarizing function on the light-incident surface of the display module for implementing image displaying. Moreover, while a grounded anti-static film is formed on a part of the light-emitting surface of the display module corresponding to the non-display area, a metal grating film having a polarizing function is formed on a part of the light-emitting surface of the display module corresponding to the display area, so that the metal grating film and the anti-static film can share the light-emitting surface of the display module without any overlapping, such that the influence of static on the internal electric field of the display panel can be shielded while the thickness of the display panel can be reduced.

Compared with the prior art, the method for manufacturing a liquid crystal display panel provided by the present disclosure has the same advantageous effect as that of the liquid crystal display panel provided by the above technical solution, which would be omitted here.

Compared with the prior art, the display device provided by the present disclosure has the same advantageous effect as that of the liquid crystal display panel provided by the above technical solution, which would be omitted here.

Figure 2:
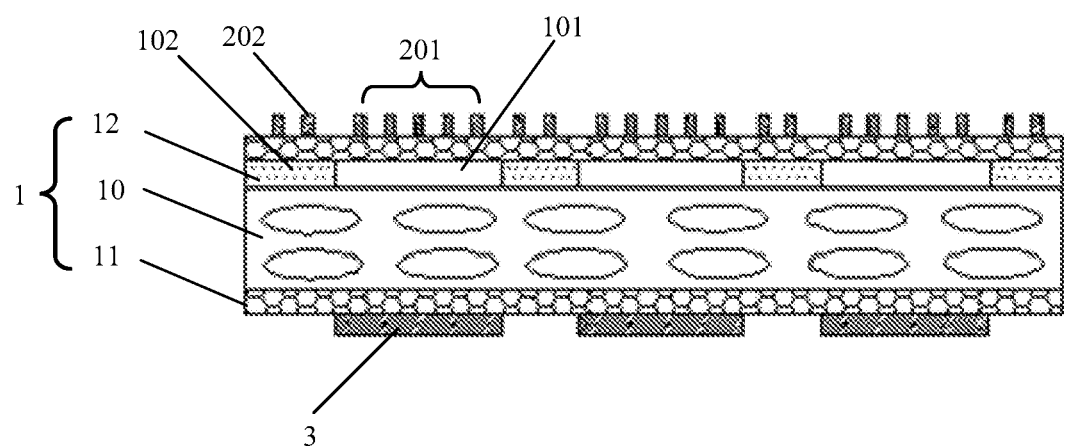
FIG. 2 is a sectional view of A-A' in FIG. 1.
Figure 3:
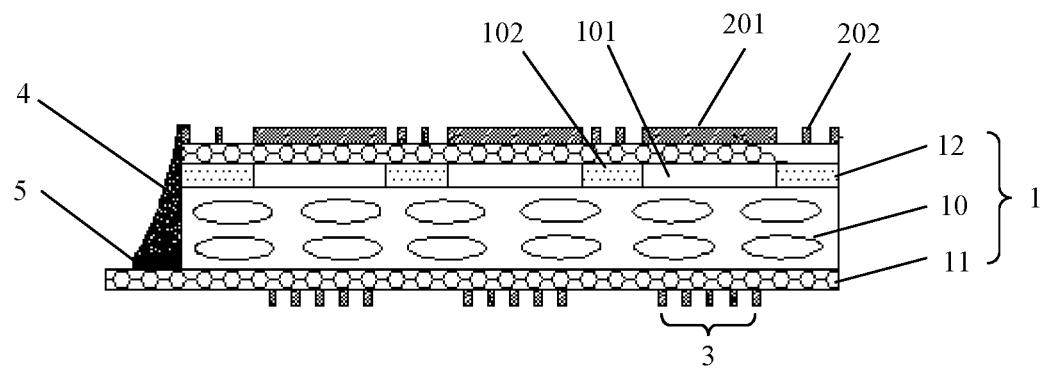
FIG. 3 is a sectional view of B-B' in FIG. 1.

Referring to FIGS. 1-3, the embodiment of the present disclosure provides a liquid crystal display panel, comprising a display module 1, the display module 1 including a plurality of pixel units, each of the pixel units including a display area 101 and a non-display area 102, wherein a grounded anti-static film 202 is formed on a part of a light-emitting surface of the display module 1 corresponding to the non-display area 102, and a metal grating film 201 having a polarizing function is formed on a part of the light-emitting surface of the display module 1 corresponding to the display area 101.

During manufacturing and practical usage of the liquid crystal display panel, static is generated at the light-emitting surface of the display module 1, which is lead into a grounding wire through the anti-static film 202; during practical usage, the light emitted from the light-emitting surface of the display module 1 is polarized by the metal grating film 201 for implementing image displaying.

According to the usage process of the liquid crystal display panel, a grounded anti-static film 202 is formed on a part of a light-emitting surface of the display module 1 corresponding to the non-display area 102, such that the static generated during the usage of the liquid crystal display panel can be lead out through the anti-static film 202, while a metal grating film 201 having a polarizing function is formed on a part of the light-emitting surface of the display module 1 corresponding to the display area 101, such that during the manufacturing of the display device, it is unnecessary to arrange a layer of polarizing film having a polarizing function on the light-emitting surface of the display module 1, but instead, it is only necessary to arrange a layer of polarizing film having a polarizing function on the light-incident surface of the display module 1 for implementing image displaying. Moreover, while a grounded anti-static film 202 is formed on a part of the light-emitting surface of the display module 1 corresponding to the non-display area, a metal grating film 201 having a polarizing function is formed on a part of the light-emitting surface of the display module 1 corresponding to the display area, the metal grating film 201 and the anti-static film 202 can share the light-emitting surface of the display module 1 without any overlapping, such that the influence of static on the internal electric field of the display panel can be shielded while the thickness of the display panel can be reduced.

It is to be noted that, in order to facilitate application of the liquid crystal display panel provided by the embodiment to a display device, in the embodiment, the metal grating film 201 and the anti-static film 202 are disposed on the same layer, which not only decreases the number of film layers within the display module to thin the display module, but also simplifies the structure of the display device to enable the liquid crystal display panel to be applied to a display device more conveniently. In addition, since the metal grating film 201 and the anti-static film 202 are disposed on the same layer, when manufacturing the display module 1, the metal grating film 201 and the anti-static film 202 can be made by one patterning process, thereby simplifying the manufacturing process of the liquid crystal display panel.

Furthermore, at present, the material for the anti-static film 202 is generally tin indium oxide, which has a relatively great resistance, such that the anti-static film 202 cannot effectively lead out the static. Therefore, it may be defined that the material for the anti-static film 202 is a metal material, and that the resistance of the metal material is less than the resistance of tin indium oxide, such that the speed at which the static is lead into the grounding wire through the anti-static film 202 is higher than that at which the static is lead into the grounding wire through an anti-static film 202 made of tin indium oxide, so that the static-leading out capability of the anti-static film 202 is greatly enhanced relative to the static-leading out capability of an existing anti-static film 202 made of tin indium oxide.

It can be understood that the display module 1 in the embodiment is selected from various existing ADS display panels. For example, referring to FIGS. 2 and 3, each of the pixel units comprised in the display module 1 includes a first display substrate 11, a second display substrate 12, and a liquid crystal layer 10 located between the first display substrate 11 and the second display substrate 12; an anti-static film 202 and a metal grating film 201 are provided on a surface of the second display substrate 12 that is away from the liquid crystal layer. Furthermore, when the first display substrate 11 is an array substrate, the second display substrate 12 is a color film substrate, while when the first display substrate 11 is a color film substrate, the second display substrate 12 is an array substrate.

Figure 4:
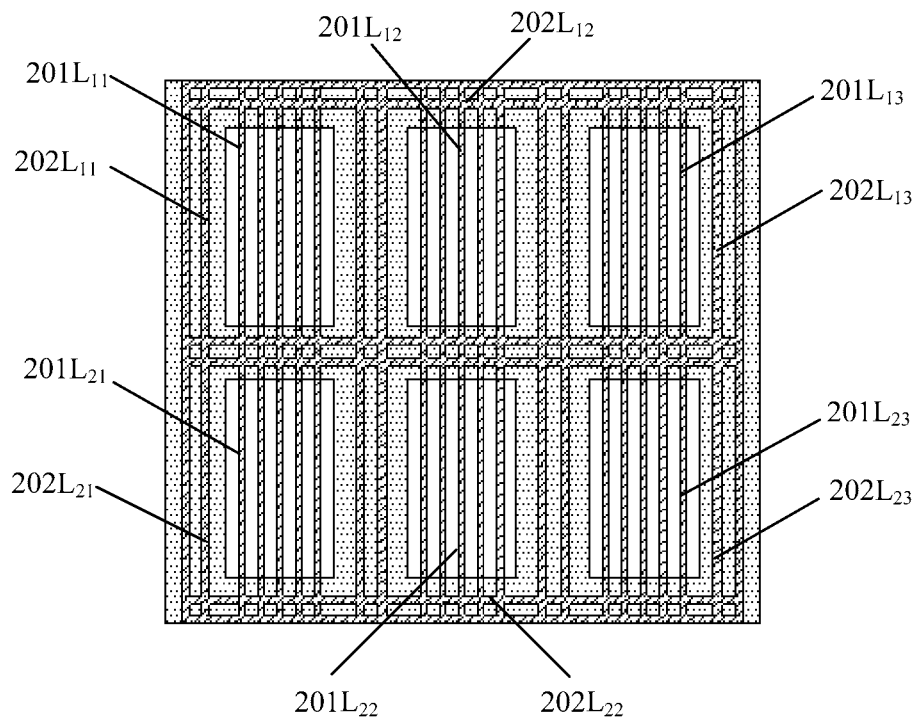
FIG. 4 is a structural schematic diagram showing an application of a second structure of a liquid crystal display panel provided by exemplary embodiments of the present disclosure to a display device.
Figure 5:
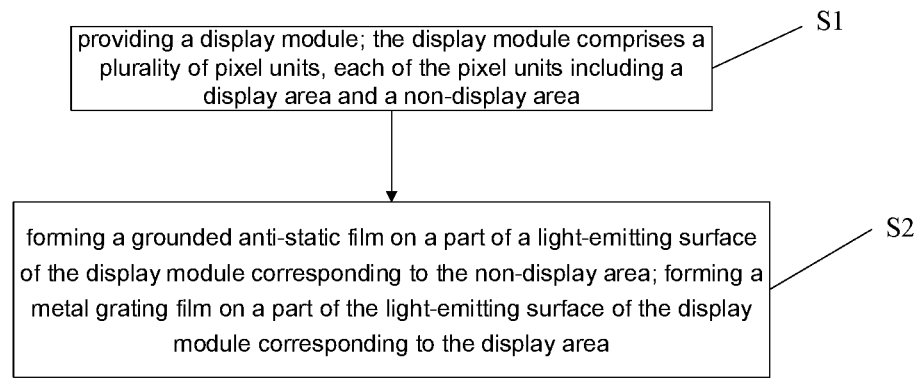
FIG. 5 is a flow chart showing the manufacturing of a liquid crystal display panel provided by exemplary embodiments of the present disclosure.

In particular, referring to FIG. 1, the metal grating film 201 and the anti-static film 202 in the embodiment may be independently provided, such that the metal grating film 201 is insulated from the anti-static film 202; referring to FIG. 4, the metal grating film 201 and the anti-static film 202 in the embodiment may also be connected together so that during the usage of the liquid crystal display panel, the static generated on the metal grating film 201 can be lead into the grounding wire through the anti-static film 202 so as to further shield the influence of static on the internal electric field of the ADS display panel, wherein the connection herein may be an ordinary electrical connection or a substantial physical connection.

Illustratively, referring to FIGS. 2 and 3, in each of the pixel units in the liquid crystal display panel provided by the embodiment, the metal grating film 201 comprises a plurality of metal grating units, and the anti-static film 202 comprises a plurality of grounded metal conductive units; the plurality of metal grating units, the plurality of metal conductive units and the plurality of pixel units correspond to one another; each of the metal grating units is located in a display area 101 corresponding to the pixel units, and each of the metal conductive units is located in a non-display area 102 corresponding to the pixel units, such that one pixel unit respectively corresponds to one metal grating unit and one metal conductive unit.

Alternatively, referring to FIGS. 1 and 4, the plurality of metal conductive units may be connected (as shown in FIGS. 1 and 4) or not connected (not shown in FIGS. 1 and 4), as long as it is ensured that the respective metal conductive units are grounded, while two adjacent metal grating units may be connected (as shown in FIG. 4) or not connected (as shown in FIG. 1), as long as it is ensured that each of the respective metal grating units has a polarizing function; wherein, when the plurality of metal conductive units in the anti-static film 202 are connected, in a case where one metal conductive unit is grounded, all the respective metal conductive units in the anti-static film 202 are grounded, and it is unnecessary to respectively ground each of the metal conductive units in the anti-static film 202.

When the plurality of metal conductive units are connected and two adjacent metal grating units are connected, the current metal grating unit can lead static into the grounding wire not only through a metal conductive unit corresponding to the same pixel unit as the current metal grating unit but also through a metal conductive unit corresponding to a pixel unit in which another metal grating unit connected with the current metal grating unit is located. Thus, by the connection among the plurality of metal conductive units and the connection among the two adjacent metal grating units, the efficiency of leading out static can be greatly enhanced.

Moreover, if the metal grating film 201 and the anti-static film 202 disposed on the same layer are formed by a pressing technique, the pattern of the anti-static film 202 formed by the connection among the plurality of metal conductive units would have a decreased complexity. Likewise, the pattern of the metal grating film 201 formed by the connection among the two adjacent metal grating units would also have a decreased complexity. In this case, when the metal grating film 201 and the anti-static film 202 are formed by a nano-pressing technique, the arrangement of the press projects of the press template as used is relatively simple, thereby simplifying the process for manufacturing the press template and reducing the difficulty in manufacturing the metal grating film 201 and the anti-static film 202.

It is to be noted that, referring to FIG. 1, when the metal grating film 201 and the anti-static film 202 in the embodiment are independently provided, each of the metal grating units is independent from corresponding one of the metal conductive units, such that it can be ensured each of the metal grating units is insulated from the corresponding one of the metal conductive units; referring to FIG. 4, in the embodiment, when the metal grating film 201 is connected to the anti-static film 202, each of the metal grating units is connected to corresponding one of the metal conductive units, such that it can be ensured that when using the liquid crystal display panel, the static generated on the metal grating unit can be lead into the grounding wire through the corresponding metal conductive unit.

It is understandable that in the embodiment, the pattern of the metal grating film 201 is formed by a plurality of metal grating units, and the pattern of the anti-static film 202 is formed by a plurality of metal conductive units.

In particular, referring to FIGS. 1 and 4, each of the metal conductive units comprises a plurality of first metal strips, and each of the metal grating units comprises a plurality of second metal strips that are disposed at intervals. In other words, the pattern of each of the metal conductive units is formed by the plurality of first metal strips, and the pattern of each of the metal grating units is formed by the plurality of second metal strips that are disposed at intervals.

The plurality of first metal strips correspond to the non-display area 102 of a respective pixel unit, the plurality of first metal strips form a frame structure, and an area within a frame of the frame structure corresponds to the display area 101 of the respective pixel unit, such that the metal grating unit corresponding to the display area 101 of the pixel unit can be located within the area within the frame of the frame structure formed by the plurality of first metal strips in the metal conductive unit corresponding to the non-display area 102 of the pixel unit The plurality of second metal strips correspond to the display area 101 of a respective pixel unit. In each of the metal grating units, the strips of the plurality of second metal strips extend in the same direction so as to ensure that the polarizing direction of the metal grating units corresponding to each of the pixel units are consistent, such that the light emitted from the light-emitting surface of the display module 1 needs to be polarized only once through the respective metal grating units to enable the light beams emitted from the light-emitting surface of the display module 1 to be polarized as the emitted light beams having the same direction, thereby implementing image displaying.

Referring to FIGS. 1-4, considering that the plurality of pixel units of the display module 1 are arranged in a matrix, in the matrix, the number of pixel units in each row is M, and the number of pixel units in each column is N, the numbers of strips of the second metal strips in the respective metal grating units are same and correspond to each other, both M and N are integers greater than or equal to 1.

When the strip of each of the second metal strips extends in the same direction as the column direction of the matrix (as shown in FIGS. 1 and 4), the second metal strip of the metal grating unit corresponding to the pixel unit at the ith row and the jth column is connected correspondingly to the second metal strip of the metal grating unit corresponding to the pixel unit at the (i+1)th row and the jth column, such that two adjacent metal grating units are connected to each other; wherein $1 \leq i \leq N$, $1 \leq j \leq M$.

When the strip of each of the second metal strips extends in the same direction as the row direction of the matrix (as not shown in FIGS. 1 and 4), the second metal strip of the metal grating unit corresponding to the pixel unit at the ith row and the jth column is connected correspondingly to the second metal strip of the metal grating unit corresponding to the pixel unit at the ith row and the (j+1)th column, such that two adjacent metal grating units are connected to each other.

Further, in each of the metal conductive units, the plurality of first metal strips include a first type of metal strips and a second type of metal strips; the strips of the first type of metal strips extend in the same direction as that in which the strip of each of the second metal strips extends, and the strips of the second type of the metal strips extend in a direction perpendicular to that in which the strip of each of the second metal strip extends.

When the strip of each of the second metal strips extends in the same direction as the column direction of the matrix, in each of the metal conductive units, the first type of the strips include a first column of metal strips and a second column of metal strips, and the second type of the metal strips include a first row of metal strips and a second row of metal strips; when the strip of each of the second metal strip extends in the same direction as the row direction of the matrix, the first type of metal strips include a first row of metal strips and a second row of metal strips, and the second type of the metal strips include a first column of metal strips and a second column of metal strips.

The first column of metal strips in each of the metal conductive units is located at a first side of the respective pixel unit, the second column of metal strips in each of the metal conductive units is located at a second side of the respective pixel unit, the first row of metal strips in each of the metal conductive units is located at a third side of the respective pixel unit, and the second row of metal strips in each of the metal conductive units is located at a fourth side of the respective pixel unit; the first row of metal strips in the metal conductive unit corresponding to the respective pixel units in the ith row are connected in sequence, the second row of metal strips in the metal conductive unit corresponding to the respective pixel units in the ith row are connected in sequence; the first column of metal strips in the metal conductive unit corresponding to the respective pixel units in the jth column are connected in sequence, and the second column of metal strips in the metal conductive unit corresponding to the respective pixel units in the jth column are connected in sequence, such that it can be ensured that while the metal conductive units corresponding to the respective pixel units form a frame structure, the respective metal conductive units are connected to form a lattice structure as shown in FIGS. 1 and 4.

In order to illustrate the positional relations between the respective pixel units and the corresponding metal conductive units, and the corresponding metal grating units of the display module 1 in the liquid crystal display panel provided by the embodiment, detailed descriptions are given below taking FIGS. 1-4 as examples.

Referring to FIG. 4: the display module 1 comprises 6 pixel units, and the 6 pixel units are arranged in a 2×3 matrix, i.e., in said 2×3 matrix, the number of pixel units in each row is 3, and the number of pixel units in each column is 2. In order to facilitate the description, it is set that the metal grating unit corresponding to the pixel unit at the first row and the first column is a first row first column metal grating unit $201L_{11}$, the metal grating unit corresponding to the pixel unit at the first row and the second column is a first row second column metal grating unit $201L_{12}$, the metal grating unit corresponding to the pixel unit at the first row and the third column is a first row third column metal grating unit $201L_{13}$, the metal grating unit corresponding to the pixel unit at the second row and the first column is a second row first column metal grating unit $201L_{21}$, the metal grating unit corresponding to the pixel unit at the second row and the second column is a second row second column metal grating unit $201L_{22}$, the metal grating unit corresponding to the pixel unit at the second row and the third column is a second row third column metal grating unit $201L_{23}$, the metal conductive unit corresponding to the pixel unit at the first row and the first column is a first row first column metal conductive unit $202L_{11}$, the metal conductive unit corresponding to the pixel unit at the first row and the second column is a first row second column metal conductive unit $202L_{12}$, the metal conductive unit corresponding to the pixel unit at the first row and the third column is a first row third column metal conductive unit $202L_{13}$, the metal conductive unit corresponding to the pixel unit at the second row and the first column is a second row first column metal conductive unit $202L_{21}$, the metal conductive unit corresponding to the pixel unit at the second row and the second column is a second row second column metal conductive unit $202L_{22}$, the metal conductive unit corresponding to the pixel unit at the second row and the third column is a second row third column metal conductive unit $202L_{23}$.

In particular, the commonness between the structure as shown in FIG. 4 and the structure as shown in FIG. 1 is that they are both in a 2×3 matrix, and the metal conductive units corresponding to the respective pixel units are connected together, and the difference is that the metal grating units corresponding to two adjacent pixel units are connected, and the metal grating unit corresponding to each of the pixel units and the metal conductive unit corresponding to the pixel unit are connected together. Referring to FIGS. 1 and 4, in the 2×3 matrix, the specific structure in which the metal conductive units corresponding to the respective pixel units are connected together is as follows:

In a metal conductive unit corresponding to a respective pixel unit, the directions of the first column of metal strips are all located on the left side of the pixel unit, the directions of the second column of metal strips are all located on the right side of the pixel unit, the directions of the first row of metal strips are all located on the upper side of the pixel unit, and the directions of the second row of metal strips are all located on a lower side of the pixel unit.

Furthermore, the first column of metal strips of the first row first column metal conductive unit $202L_{11}$ and the first column of metal strips of the second row first column metal conductive unit $202L_{21}$ are connected to each other, the second column of metal strips of the first row first column metal conductive unit $202L_{11}$ and the second column of metal strips of the second row first column metal conductive unit $202L_{21}$ are connected to each other; the first column of metal strips of the first row second column metal conductive unit $202L_{12}$ and the first column of metal strips of the second row second column metal conductive unit $202L_{22}$ are connected to each other, the second column of metal strips of the first row second column metal conductive unit $202L_{12}$ and the second column of metal strips of the second row second column metal conductive unit $202L_{22}$ are connected to each other; the first column of metal strips of the first row third column metal conductive unit $202L_{13}$ and the first column of metal strips of the second row third column metal conductive unit $202L_{23}$ are connected to each other, the second column of metal strips of the first row third column metal conductive unit $202L_{13}$ and the second column of metal strips of the second row third column metal conductive unit $202L_{23}$ are connected to each other.

The first row of metal strips of the first row first column metal conductive unit $202L_{11}$, the first row of metal strips of the first row second column metal conductive unit $202L_{12}$ and the first row of metal strips of the first row third column metal conductive unit $202L_{23}$ are connected to each other; the second row of metal strips of the first row first column metal conductive unit $202L_{11}$, the second row of metal strips of the first row second column metal conductive unit $202L_{12}$ and the second row of metal strips of the first row third column metal conductive unit $202L_{23}$ are connected to each other; the first row of metal strips of the second row first column metal conductive unit $202L_{21}$, the first row of metal strips of the second row second column metal conductive unit $202L_{22}$ and the first row of metal strips of the second row third column metal conductive unit $202L_{23}$ are connected to each other; the second row of metal strips of the second row first column metal conductive unit $202L_{21}$, the second row of metal strips of the second row second column metal conductive unit $202L_{22}$ and the second row of metal strips of the second row third column metal conductive unit $202L_{23}$ are connected to each other.

Due to presence of said connection structure, each of the metal conductive units in FIGS. 1 and 4 has a frame structure, and the anti-static film 202 formed by the respective metal conductive units has a lattice structure, such that as long as a metal strip (no matter a column metal strip or a row metal strip) in any of the metal conductive units is grounded, can all the metal conductive units be grounded.

Referring to FIG. 4, in the 2×3 matrix, metal grating units corresponding to two adjacent pixel units are connected, and the specific structure is as follows:

The number of strips of the second metal strips of the metal grating unit corresponding to each respective pixel unit is same, and the direction in which the strips of the respective second metal strips of the metal grating unit corresponding to each of the pixel units extend is same as the column direction of the 2×3 matrix. It is understandable that when the direction in which the strips of the respective second metal strips of the metal grating unit corresponding to each of the pixel units extend is same as the column direction of the 2×3 matrix, the strips of the respective second metal strips of the first row first column metal grating unit $201L_{11}$, the strips of the respective second metal strips of the first row second column metal grating unit $201L_{12}$, the strips of the respective second metal strips of the first row third column metal grating unit $201L_{13}$, the strips of the respective second metal strips of the second row first column metal grating unit $201L_{21}$, the strips of the respective second metal strips of the second row second column metal grating unit $201L_{22}$ and the strips of the respective second metal strips of the second row third column metal grating unit $201L_{23}$ extend in the same direction.

The respective second metal strips of the first row first column metal grating unit $201L_{11}$ and the respective second metal strips of the second row first column metal grating unit $201L_{21}$ are connected in correspondence with each other, the respective second metal strips of the first row second column metal grating unit $201L_{12}$ and the respective second metal strips of the second row second column metal grating unit $201L_{22}$ are connected in correspondence with each other, and the respective second metal strips of the first row third column metal grating unit $201L_{13}$ and the respective second metal strips of the second row third column metal grating unit $201L_{23}$ are connected in correspondence with each other.

Due to the presence of said structure, the respective metal grating units have the same polarization direction, such that it can be ensured the light emitted from the light-emitting surface of the display module 1 can satisfy image displaying only through one polarization. In addition, when two adjacent metal grating units are connected, the two adjacent metal grating units are two adjacent metal grating units in the polarization direction.

Furthermore, referring to FIG. 4, in the 2×3 matrix, the connection of a metal grating unit corresponding to each of the pixel units with the corresponding metal conductive unit is implemented by the following structure:

the respective second metal strips of the first row first column metal grating unit $201L_{11}$ are connected with the first row of metal strips of the first row first column metal conductive unit $202L_{11}$, the respective second metal strips of the first row first column metal grating unit $201L_{11}$ are connected with the second row of metal strips of the first row first column metal conductive unit $202L_{11}$, the respective second metal strips of the first row second column metal grating unit $201L_{12}$ are connected with the first row of metal strips of the first row second column metal conductive unit $202L_{12}$, the respective second metal strips of the first row second column metal grating unit $201L_{12}$ are connected with the second row of metal strips of the first row second column metal conductive unit $202L_{12}$, the respective second metal strips of the first row third column metal grating unit $201L_{13}$ are connected with the first row of metal strips of the first row third column metal conductive unit $202L_{13}$, and the respective second metal strips of the first row third column metal grating unit $201L_{13}$ are connected with the second row of metal strips of the first row third column metal conductive unit $202L_{13}$.

The respective second metal strips of the second row first column metal grating unit $201L_{21}$ are connected with the first row of metal strips of the second row first column metal conductive unit $202L_{21}$, the respective second metal strips of the second row first column metal grating unit $201L_{21}$ are connected with the second row of metal strips of the second row first column metal conductive unit $202L_{21}$, the respective second metal strips of the second row second column metal grating unit $201L_{22}$ are connected with the first row of metal strips of the second row second column metal conductive unit $202L_{22}$, the respective second metal strips of the second row second column metal grating unit $201L_{22}$ are connected with the second row of metal strips of the second row second column metal conductive unit $202L_{22}$, the respective second metal strips of the second row third column metal grating unit $201L_{23}$ are connected with the first row of metal strips of the second row third column metal conductive unit $202L_{23}$, and the respective second metal strips of the second row third column metal grating unit $201L_{23}$ are connected with the second row of metal strips of the second row third column metal conductive unit $202L_{23}$.

Due to the presence of said structure, a metal grating unit corresponding to each of the pixel units is connected with a corresponding metal conductive unit, and two adjacent metal grating units are connected to each other, such that the anti-static film 202 formed by the plurality of metal conductive units and the metal grating film 201 formed by the plurality of metal grating units form an interlinked lattice structure, and when the anti-static film 202 and the metal conductive film 201 form an interlinked lattice structure, the metal grating unit corresponding to each of the pixel units can lead static into the grounding wire not only via the metal conductive unit corresponding to the pixel unit but also via the metal conductive unit corresponding to a pixel unit in which another metal grating unit to which the metal grating unit is connected locates, which increases ways to lead static into the grounding wire and further enhances the efficiency of leading out static.

Referring to FIGS. 1-5, the embodiment of the present disclosure further provides a method for manufacturing a liquid crystal display panel, comprising:

S1: providing a display module 1; the display module 1 comprises a plurality of pixel units, each of the pixel units including a display area 101 and a non-display area 102;

S2: forming a grounded anti-static film 202 on a part of a light-emitting surface of the display module 1 corresponding to the non-display area 102; forming a metal grating film 201 on a part of the light-emitting surface of the display module 1 corresponding to the display area 101.

Compared with the prior arts, the method for manufacturing a liquid crystal display panel provided by the embodiment of the present disclosure has advantageous effects identical with those of the liquid crystal display panel provided by the above embodiment, which would be omitted here.

Furthermore, in order to improve the static-leading out capability, the resistance of the anti-static film 102 is less than the resistance of tin indium oxide, and the specific reason is as recited in the above embodiment.

It is understandable that in the method for manufacturing a liquid crystal display panel provided by the embodiment, the method for manufacturing the display module as provided is same as the prior art. The method for manufacturing the display module is described in detail below with reference to the drawings.

Figure 6:
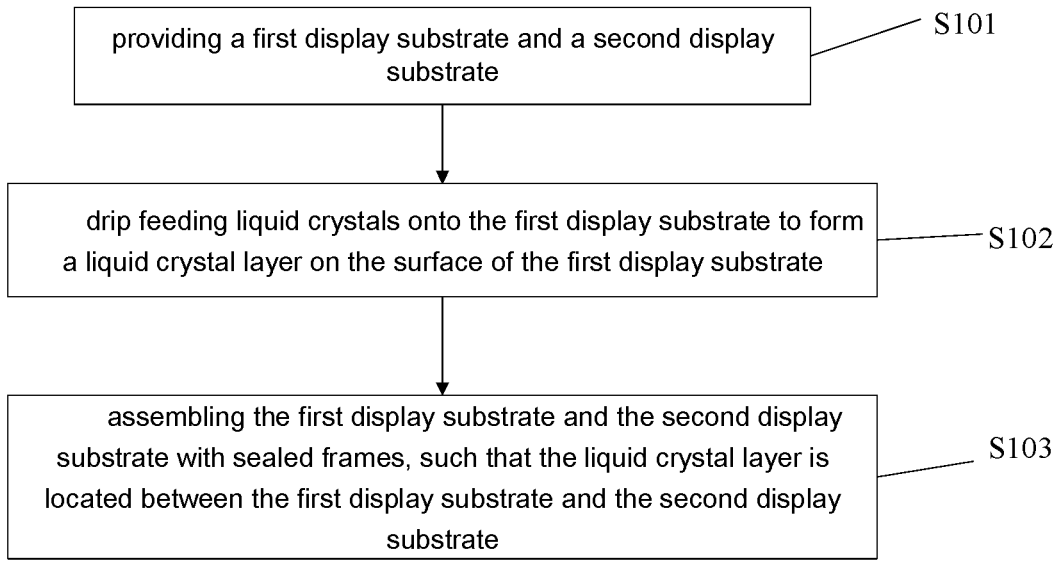
FIG. 6 is a flow chart showing the manufacturing of a display module according to exemplary embodiments of the present disclosure.
Figure 7:
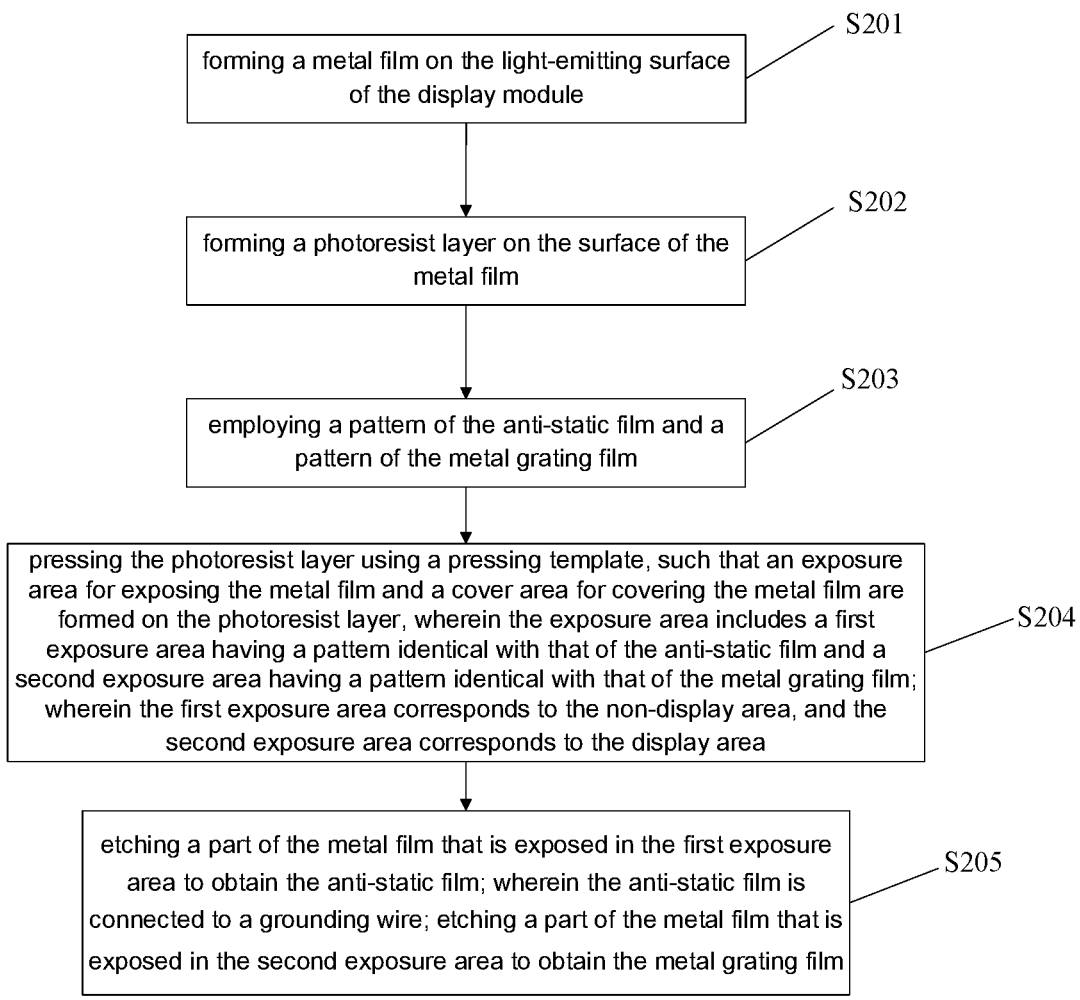
FIG. 7 is a flow chart showing the manufacturing of an anti-static film and a metal grating film according to exemplary embodiments of the present disclosure.

Referring to FIGS. 2 and 6, the method for manufacturing a display module in the embodiment comprises:

S101: providing a first display substrate 11 and a second display substrate 12;

S102: drip feeding liquid crystals onto the first display substrate 11 to form a liquid crystal layer 10 on the surface of the first display substrate;

S103: assembling the first display substrate 11 and the second display substrate 12 with sealed frames, such that the liquid crystal layer 10 is located between the first display substrate 11 and the second display substrate 12.

When the first display substrate 11 is an array substrate, the second display substrate 12 is a color film substrate; when the first display substrate 11 is a color film substrate, the second display substrate 12 is an array substrate. In other words, when liquid crystals are drip fed, they may be drip fed onto an array substrate or a color film substrate.

In order to enable a liquid crystal display panel manufactured according to the method for manufacturing a liquid crystal display panel provided by the embodiment to be conveniently applied to a display device, the method for manufacturing a liquid crystal display panel further comprises:

Referring to FIGS. 1-5, the anti-static film 202 and the metal grating film 201 may be disposed on the same layer, and advantageous effects thereof are as those described in the above embodiment.

In particular, when the metal grating film 201 and the anti-static film 202 are disposed on the same layer, the anti-static film and the metal grating film are formed by one patterning process, which simplifies the method for manufacturing a liquid crystal display panel; at the same time, when the liquid crystal display panel is applied to a display device, it is only necessary to provide a polarizing film or a polarizer having a polarizing function on the light-incident surface of the liquid crystal display panel, and it is unnecessary to provide a polarizer on the light-emitting surface of the liquid crystal display panel to implement the image displaying by the display device. However, it is to be noted that it is necessary to ensure that a polarizing direction of the polarizing film or polarizer having a polarizing function that is provided on the light-incident surface of the liquid crystal display panel is perpendicular to the polarizing direction of the metal grating film.

Illustratively, a nano-pressing technique may be employed to dispose the metal grating film 201 and the anti-static film 202 on the same layer, such that the metal grating film 201 formed by metal wires has a polarizing efficiency at least 20% higher than that of the existing polarizers, thereby enhancing the polarizing efficiency of the metal grating film; in the embodiment, these metal wires are present in the form of the metal strips.

In particular, referring to FIGS. 1-4 and 7, forming a grounded anti-static film 202 on a part of a light-emitting surface of the display module 1 corresponding to the non-display area 102, and forming a metal grating film 201 on a part of the light-emitting surface of the display module 1 corresponding to the display area 101 comprises:

S201: forming a metal film on the light-emitting surface of the display module 1;

S202: forming a photoresist layer on the surface of the metal film;

S203: employing a pattern of the anti-static film 202 and a pattern of the metal grating film, S204: pressing the photoresist layer using a pressing template, such that an exposure area for exposing the metal film and a cover area for covering the metal film are formed on the photoresist layer, wherein the exposure area includes a first exposure area having a pattern identical with that of the anti-static film 202 and a second exposure area having a pattern identical with that of the metal grating film 201; wherein the first exposure area corresponds to the non-display area, and the second exposure area corresponds to the display area;

S205: etching a part of the metal film that is exposed in the first exposure area to obtain the anti-static film 202; wherein the anti-static film is connected to a grounding wire;

etching a part of the metal film that is exposed in the second exposure area to obtain the metal grating film 201.

It is understandable that the anti-static film 202 and the metal grating film 201 are formed by one patterning process. In other words, the anti-static film 202 and the metal grating film 201 are obtainable only through etching once the metal film.

The embodiment of the present disclosure provides a display device, comprising the liquid crystal display panel provided by the above embodiment.

Compared with the prior arts, the display device provided by the embodiment of the present disclosure has advantageous effects identical with those of the liquid crystal display panel provided by the above embodiment, which would be omitted here.

The display device provided by the embodiment may be any product or component having a display function, such as a mobile phone, a tablet computer, a television, a display, a notebook computer, a digital photo frame or a navigator.

Further, referring to FIGS. 2 and 3, the display device further comprises a polarization layer 3 having a polarizing function, which is disposed on a part of the light-incident surface of the display module 1 of the liquid crystal display panel corresponding to the display area 101; a polarizing direction of the polarization layer 3 is perpendicular to a polarizing direction of the metal grating film 201 so as to implementing image displaying. The advantageous effects of this part are as those described in the corresponding portion of the above embodiment.

In addition, a wiring pad may be provided on the outer side of the liquid crystal display panel, and the anti-static layer 202 is connected to the grounding wire via the wiring pad 5.

Specifically, referring to FIG. 3, a silver glue 4 may be used to connect the anti-static layer 202 to the grounding member via the wiring pad 5, such that the anti-static layer 202 can be conveniently connected to the grounding wire.

In the above description of the embodiment, the specific features, structures, materials or features can be combined in any one or more of the embodiments or examples in a suitable manner.

The above is only a particular embodiment of the present disclosure, and the protection scope of the present disclosure should not be limited thereto. Any alternation or substitution that can be easily envisaged by a technician familiar with the present technical field within the technical range revealed by the present disclosure should be included in the protection scope of the present disclosure. Thus, the protection scope of the present disclosure should be based on the protection scope of the claims.

What is claimed is:

1. A liquid crystal display panel, comprising a display module, the display module including a plurality of pixel units, each of the plurality of pixel units including a display area and a non-display area, wherein a grounded anti-static film is formed on a part of a light-emitting surface of the display module corresponding to the non-display area, and a metal grating film having a polarizing function is formed on a part of the light-emitting surface of the display module corresponding to the display area,
   wherein the metal grating film comprises a plurality of metal grating units, and the grounded anti-static film comprises a plurality of grounded metal conductive units;
   wherein the plurality of metal grating units are located in a display area corresponding to the plurality of pixel units;
   wherein the plurality of grounded metal conductive units are located in a non-display area corresponding to the plurality of pixel units; and
   wherein each of the plurality of grounded metal conductive units comprises a plurality of first metal strips, the plurality of first metal strips corresponding to the non-display area corresponding to the plurality of pixel units, the plurality of first metal strips forming a frame structure, wherein an area within a frame of the frame structure corresponds to the display area corresponding to the plurality of pixel units, one pixel unit respectively corresponds to one metal grating unit and one grounded metal conductive unit, and any two adjacent pixel units do not share any one of the plurality of first metal strips.

2. The liquid crystal display panel according to claim 1, wherein the metal grating film and the grounded anti-static film are disposed on a same layer.

3. The liquid crystal display panel according to claim 1, wherein each of the plurality of metal grating units is independent from the respective grounded metal conductive unit; or
   each of the plurality of metal grating units is connected to the respective grounded metal conductive unit.

4. The liquid crystal display panel according to claim 1, wherein the plurality of grounded metal conductive units is connected, and two adjacent metal grating units are connected to each other.

5. The liquid crystal display panel according to claim 1, wherein
   each of the plurality of metal grating units comprises a plurality of second metal strips that are provided at intervals, the plurality of second metal strips corresponding to the display area corresponding to the plurality of pixel units, and in each of the metal grating units, the second metal strips of the plurality of second metal strips extend in the same direction.

6. The liquid crystal display panel according to claim 5, wherein the plurality of pixel units is arranged in a matrix, in which the number of pixel units in each row is M, and the number of pixel units in each column is N, the number of the second metal strips in each of the metal grating units is same and corresponds to one another;
   the direction in which each of the second metal strips extends is same as a column direction of the matrix; the second metal strips of the metal grating unit corresponding to the pixel unit at the ith row and the jth column are connected correspondingly to the second metal strips of the metal grating unit corresponding to the pixel unit at the (i+1)th row and the jth column; or
   the direction in which each of the second metal strips extends is same as a row direction of the matrix; the second metal strips of the metal grating unit corresponding to the pixel unit at the ith row and the jth column are connected correspondingly to the second metal strips of the metal grating unit corresponding to the pixel unit at the ith row and the (j+1)th column.

7. The liquid crystal display panel according to claim 6, wherein in each of the plurality of grounded metal conductive units, the plurality of first metal strips include a first type of metal strips and a second type of metal strips; the metal strips of the first type of metal strips extend in a same direction as that in which each of the second metal strips extends, and the metal strips of the second type of metal strips extend in a direction perpendicular to the direction in which each of the second metal strips extends;
   when the direction in which each of the second metal strips extends is same as the column direction of the matrix, in each of the plurality of grounded metal conductive units, the first type of metal strips includes a first column of metal strips and a second column of metal strips; the second type of the metal strips includes a first row of metal strips and a second row of metal strips; when the direction in which the strip of each of the second metal strips extends is same as the row direction of the matrix, in each of the plurality of grounded metal conductive units, the first type of metal strips includes a first row of metal strips and a second row of metal strips; the second type of metal strips includes a first column of metal strips and a second column of metal strips; wherein
   the first column of metal strips in each of the plurality of grounded metal conductive units is located at a first side of the respective pixel unit, the second column of metal strips in each of the plurality of grounded metal conductive units is located at a second side of the respective pixel unit, the first row of metal strips in each of the plurality of grounded metal conductive units is located at a third side of the respective pixel unit, and the second row of metal strips in each of the plurality of grounded metal conductive units is located at a fourth side of the respective pixel unit;
   the first row of metal strips in the grounded metal conductive unit corresponding to the respective pixel units in the ith row are connected in sequence, the second row of metal strips in the grounded metal conductive unit corresponding to the respective pixel units in the ith row are connected in sequence; the first column of metal strips in the grounded metal conductive unit corresponding to the respective pixel units in the jth column are connected in sequence, and the second column of metal strips in the grounded metal conductive unit corresponding to the respective pixel units in the jth column are connected in sequence.

8. A method for manufacturing a liquid crystal display panel, comprising:
   providing a display module, the display module comprising a plurality of pixel units, each of the plurality of pixel units including a display area and a non-display area;
   forming a grounded anti-static film on a part of a light-emitting surface of the display module corresponding to the non-display area; and
   forming a metal grating film on a part of the light-emitting surface of the display module corresponding to the display area, wherein the metal grating film comprises a plurality of metal grating units, and the grounded anti-static film comprises a plurality of grounded metal conductive units;

wherein the plurality of metal grating units are located in a display area corresponding to the plurality of pixel units;

wherein the plurality of grounded metal conductive units are located in a non-display area corresponding to the plurality of pixel units; and wherein each of the plurality of grounded metal conductive units comprises a plurality of first metal strips, the plurality of first metal strips corresponding to the non-display area corresponding to the plurality of pixel units, the plurality of first metal strips forming a frame structure, wherein an area within a frame of the frame structure corresponds to the display area corresponding to the plurality of pixel units, one pixel unit respectively corresponds to one metal grating unit and one grounded metal conductive unit, and any two adjacent pixel units do not share any one of the plurality of first metal strips.

9. The method for manufacturing a liquid crystal display panel according to claim 8, wherein the grounded anti-static film and the metal grating film are disposed on a same layer.

10. The method for manufacturing a liquid crystal display panel according to claim 9, wherein the grounded anti-static film and the metal grating film are formed by one patterning process.

11. The method for manufacturing a liquid crystal display panel according to claim 9, wherein forming a grounded anti-static film on a part of a light-emitting surface of the display module corresponding to the non-display area, and forming a metal grating film on a part of the light-emitting surface of the display module corresponding to the display area comprise:

forming a metal film on the light-emitting surface of the display module;

forming a photoresist layer on a surface of the metal film;

pressing the photoresist layer with a pressing template according to the pattern of the grounded anti-static film and the pattern of the metal grating film, such that an exposure area for exposing the metal film and a cover area for covering the metal film are formed on the photoresist layer, the exposure area including a first exposure area having a pattern identical with that of the grounded anti-static film and a second exposure area having a pattern identical with that of the metal grating film; wherein the first exposure area corresponds to the non-display area, and the second exposure area corresponds to the display area;

etching a portion of the metal film that is exposed in the first exposure area to obtain the grounded anti-static film, wherein the grounded anti-static film is connected to a grounding wire; and etching a portion of the metal film that is exposed in the second exposure area to obtain the metal grating film.

12. A display device, comprising the liquid crystal display panel according to claim 1.

13. The display device according to claim 12, wherein the display device further comprises a polarizing layer having a polarizing function, wherein the polarizing layer is disposed at a portion of a light-incident surface of the display module in the liquid crystal display panel corresponding to the display area, and a polarizing direction of the polarizing layer is perpendicular to the polarizing direction of the metal grating film.

14. The display device according to claim 12, wherein a wiring pad is provided at the outer side of the liquid crystal display panel, and the grounded anti-static film is connected to the grounding wire via the wiring pad.

* * * * *